A. N. MOLINE.
WEED PULLER AND TREE TRIMMER.
APPLICATION FILED JUNE 8, 1908.
913,225.
Patented Feb. 23, 1909.
2 SHEETS—SHEET 1.
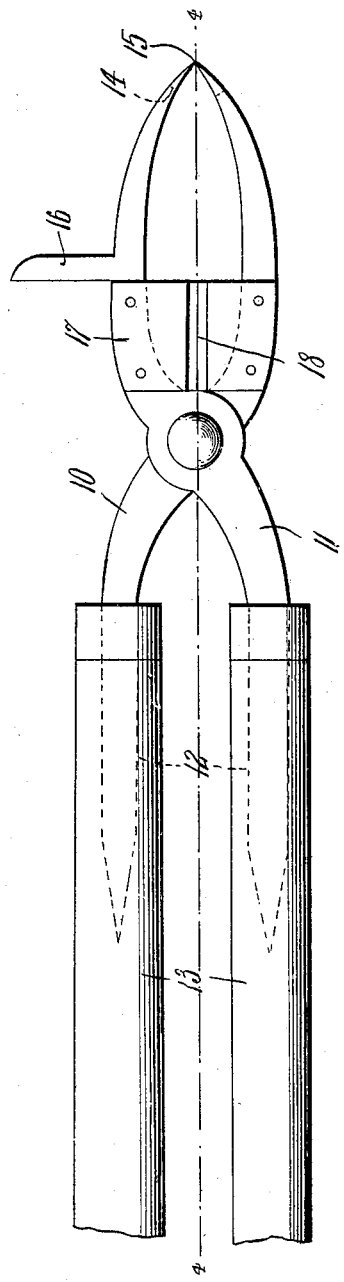
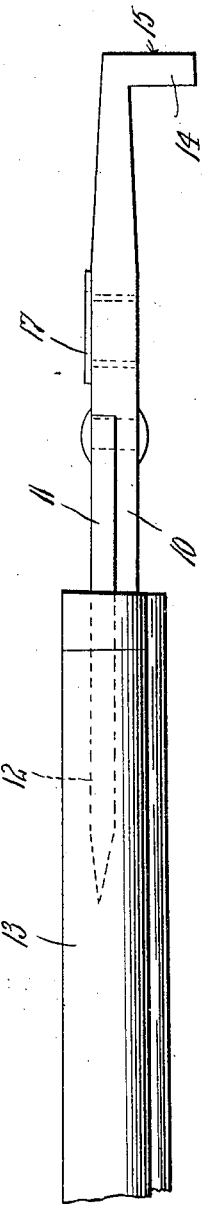
Witnesses
J. H. Crawford
F. G. Smith
Inventor
Axel N. Moline
By Chandler & Chandler
Attorneys
THE NORRIS PETERS CO., WASHINGTON, D. C.

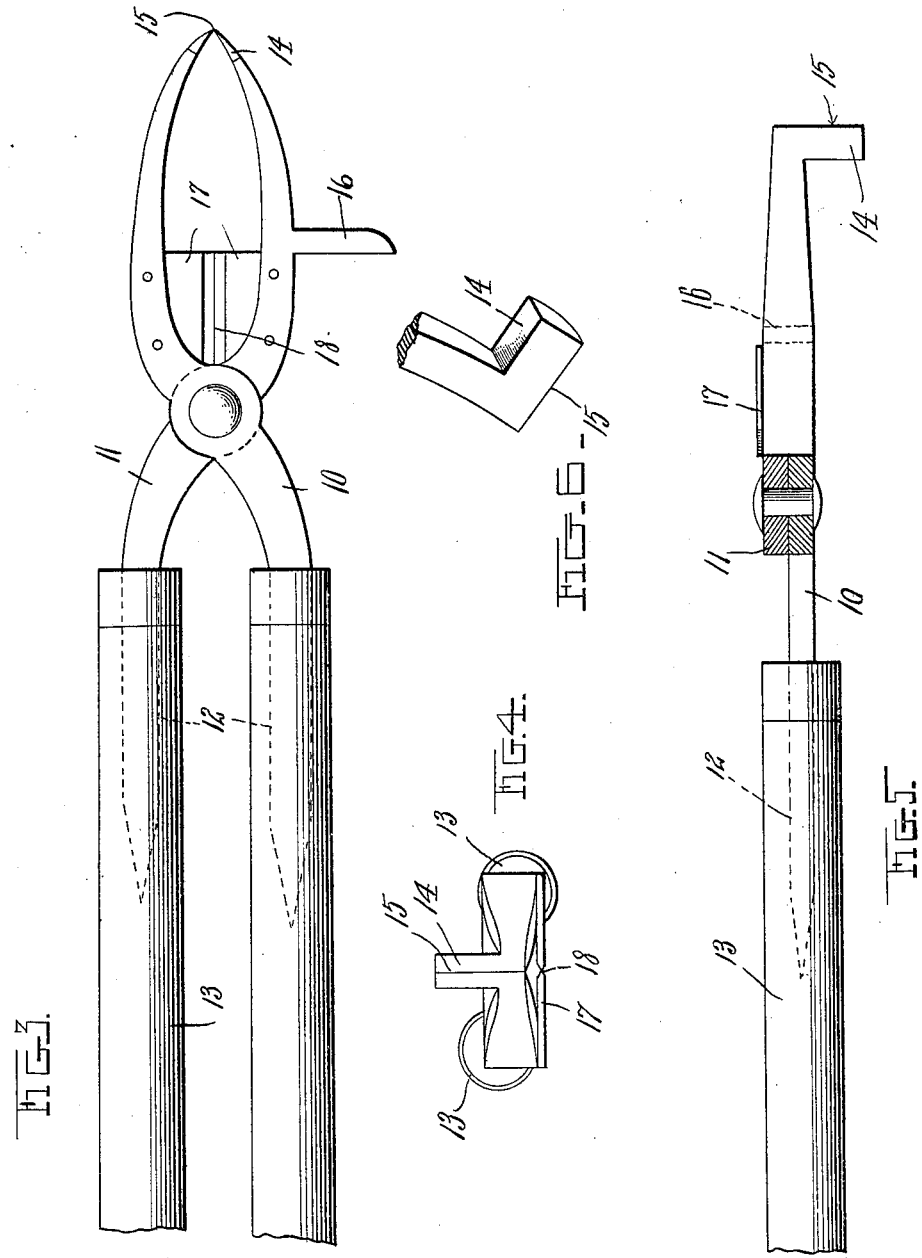

UNITED STATES PATENT OFFICE.

AXEL N. MOLINE, OF ST. JOSEPH, MISSOURI.

WEED-PULLER AND TREE-TRIMMER.

No. 913,225.  Specification of Letters Patent.  Patented Feb. 23, 1909.

Application filed June 8, 1908. Serial No. 437,337.

*To all whom it may concern:*

Be it known that I, AXEL N. MOLINE, a citizen of the United States, residing at St. Joseph, in the county of Buchanan, State of Missouri, have invented certain new and useful Improvements in Weed-Pullers and Tree-Trimmers; and I do hereby declare the following to be a full, clear, and exact description of the invention, such as will enable others skilled in the art to which it appertains to make and use the same.

This invention relates to weed pullers and tree trimmers and the primary object of the invention is to provide an implement embodying, in one and the same tool, a weed pulling means and a tree trimming means.

In carrying out my invention, I form the pivoted members of the tool each with a laterally extended weed pulling blade which coöperate to permit of the implement being used to pull weeds, and blades which are secured one to each of the members and which coöperate with each other for the purpose of severing the limbs and branches of the tree or shrub to be trimmed.

One of the novel features resides in having the weed pulling blade extended laterally from the said members so that practically no soil will be taken up when a weed is pulled from the ground, the said blade being narrow and affording but little surface to which the soil can adhere, and, another novel feature of the invention resides in providing upon one of the members a laterally extending foot rest which permits of the implement being forced into the ground.

A still further novel feature resides in so arranging the weed pulling blades with a pair of cutting blades that when it is desired to remove weeds having runners, such as "crab-grass", the cutting blade may be used to cut the runner while at the same time the clamping blades simultaneously grip the roots.

In the accompanying drawings, Figure 1 is a side elevation of the implement embodying my invention, Fig. 2 is an edge view thereof, Fig. 3 is a view similar to Fig. 1 but of the other side of the implement, Fig. 4 is an end view of the same, Fig. 5 is a horizontal sectional view on the line 4—4 of Fig. 1 of the drawings, and, Fig. 6 is a detail perspective view of the lower end portion of one of the members of the implement.

As shown in the drawings, the implement embodying my invention is comprised of a pair of cross pivoted members, one of which is indicated by the numeral 10 and the other by the numeral 11 each of the said members being formed at one end with a tang 12 which is inserted in the lower end of one of a pair of handles 13 which may be swung toward or away from each other to move the members upon their mutual pivot and cause coöperation of certain elements which will now be fully described.

To the other side of the pivot for the members from the handles, they are extended in an irregular curve as is clearly shown in Fig. 1 of the drawings, the portions of the members to the handle side of the pivot being slightly diverged and then extended in parallel relation so that when the handles are closed, they will be parallel or substantially so. Formed integral with each of the members at its lower end is a laterally extending narrow weed cutting and pulling blade portion 14 the said members being wedge shaped with the edge in the direction of their lower ends and the said blade portions being formed each with a sharpened or cutting lower edge as clearly shown in the drawings, it being understood that when the handles 13 are swung toward each other, the cutting edges 15 of the blade portions 14 will be brought into contact with each other. A foot rest 16 is formed integral with the member 11 of the implement and projects laterally therefrom but in a direction at right angles to the blade portions 14. In using the implement in pulling weeds, the handles 13 are spread apart and the implement forced, at its lower end, into the soil from which the weeds are to be removed, one foot of the user being placed upon the foot rest 16 for this purpose. After the implement has been inserted to the proper depth with one of the members 10 or 11 upon each side of the root of the weed to be pulled, the handles are swung together and the blade portion 14 caused to grip the said root. It will be understood of course that in order to pull the weed, an upward pull, is exerted upon the implement.

Secured, by riveting or otherwise, upon each of the members 10 and 11 is a blade 17 and when the members are closed or in other words when the handles are parallel, these blades have their cutting edges 18 in contact it being understood that by spreading the handles and so engaging the implement with the limb or branch of a tree or shrub to be trimmed that the said limb or branch will be received between the said cutting edges 18. The handles may be swung together to sever the branch or limb. It will also be observed that when handling crab-grass or the like the implement is used in a manner similar to that which is used in pulling ordinary weeds with the exception that the pulling and cutting blades are spread apart and the implement so positioned that the cutting blades pass over the runner of the weed while the pulling blades are in position to clasp the root. The handles are then brought together and the instrument simultaneously cuts the runner and grasps the root, which may then be easily pulled out.

What is claimed is:

1. A device of the class described comprising a pair of pivoted members formed with laterally extending coöperating blade portions, and coöperating blades secured upon the members.

2. A device of the kind described comprising a pair of pivoted members, weed grasping portions on said members, and runner cutting portions carried on said members to coact with said weed grasping portions.

3. A device of the kind described comprising a pair of pivoted members having downwardly extending weed grasping jaws, and cutting blades carried between the pivot points and the ends of said jaws.

4. A device of the kind described comprising a pair of pivoted members formed with downwardly extending weed grasping jaws, runner cutting blades held upon said jaws between the pivot point and the ends of the jaws, and a foot rest formed upon one of said jaws.

In testimony whereof, I affix my signature, in presence of two witnesses.

AXEL N. MOLINE.

Witnesses:
C. W. MEYER,
J. W. BEARD.